US012312198B2

(12) United States Patent
Swinford et al.

(10) Patent No.: US 12,312,198 B2
(45) Date of Patent: May 27, 2025

(54) SYSTEM AND METHOD FOR FOLDING PAPER CARRIERS WITH ATTACHED CARDS

(71) Applicant: DMT Solutions Global Corporation, Danbury, CT (US)

(72) Inventors: Brad Swinford, New Milford, CT (US); Robert J. Allen, Shelton, CT (US)

(73) Assignee: DMT Solutions Global Corporation, Danbury, CT (US)

(*) Notice: Subject to any disclaimer, the term of this patent is extended or adjusted under 35 U.S.C. 154(b) by 0 days.

(21) Appl. No.: 18/399,880

(22) Filed: Dec. 29, 2023

(65) Prior Publication Data

US 2024/0208765 A1 Jun. 27, 2024

Related U.S. Application Data

(63) Continuation of application No. 17/728,314, filed on Apr. 25, 2022, now Pat. No. 11,858,774, which is a (Continued)

(51) Int. Cl.
*B65H 45/14* (2006.01)
*B41J 13/12* (2006.01)
(Continued)

(52) U.S. Cl.
CPC .............. *B65H 45/14* (2013.01); *B41J 13/12* (2013.01); *B65H 29/125* (2013.01); *B65H 45/04* (2013.01); *B65H 2511/224* (2013.01)

(58) Field of Classification Search
CPC ...... B65H 45/04; B65H 45/14; B65H 45/142; B65H 45/144; B65H 45/147; B65H 2511/224; B65H 29/125; B41J 13/12
(Continued)

(56) References Cited

U.S. PATENT DOCUMENTS 3,481,596 A * 12/1969 Porth .................. B65H 45/144 493/421
4,518,380 A * 5/1985 Shimizu ............... B65H 45/141 493/420
(Continued)

FOREIGN PATENT DOCUMENTS

JP 2012-229102 A 11/2012
JP 2019-131336 A 8/2019

OTHER PUBLICATIONS

Extended European Search Report issued in European Application No. 20203377.5, date of mailing: Apr. 14, 2021, 8 pages.

*Primary Examiner* — Leslie A Nicholson, III
(74) *Attorney, Agent, or Firm* — Brown Rudnick LLP; Matthew P. York

(57) ABSTRACT

Folder systems and related methods are provided for accurately and efficiently folding a paper carrier that has a card attached without bending or dislodging the card from the carrier. A movable fold chute receives a portion of the carrier with the card attached and allows the carrier to fold while protecting the card portion of the carrier. The fold chute moves between different positions which allow the carrier to enter and exit through folding rollers along a generally straight paper path without forcing the cards around small radii, thereby preventing damage to the cards or causing them to separate from the carrier sheet.

9 Claims, 16 Drawing Sheets

Related U.S. Application Data continuation of application No. 16/731,581, filed on Dec. 31, 2019, now Pat. No. 11,414,294.

(51) Int. Cl.
*B65H 29/12* (2006.01)
*B65H 45/04* (2006.01)

(58) Field of Classification Search
USPC .......................................................... 493/420
See application file for complete search history.

(56) References Cited

U.S. PATENT DOCUMENTS

| | | | | |
|---|---|---|---|---|
| 4,944,131 | A * | 7/1990 | Gough | B65H 45/147 53/284.3 |
| 5,058,873 | A | 10/1991 | Hewitt et al. | |
| 5,701,727 | A | 12/1997 | Lundstrom et al. | |
| 5,819,666 | A * | 10/1998 | Ishikawa | B43M 5/042 270/1.03 |
| 6,042,528 | A | 3/2000 | McCumber et al. | |
| 6,589,000 | B1 * | 7/2003 | Boss | B65H 45/144 412/37 |
| 6,670,569 | B2 | 12/2003 | Smith et al. | |
| 6,846,278 | B1 | 1/2005 | Hill et al. | |
| 6,881,181 | B2 * | 4/2005 | Brown | B65H 45/142 493/419 |
| 6,974,034 | B2 | 12/2005 | Smith et al. | |
| 7,021,470 | B2 | 4/2006 | Bennett et al. | |
| 7,137,554 | B2 | 11/2006 | Bretl et al. | |
| 7,326,166 | B2 | 2/2008 | Sytema | |
| 7,463,946 | B2 | 12/2008 | Smith et al. | |
| 7,666,129 | B2 | 2/2010 | Lyga et al. | |
| 8,162,811 | B2 | 4/2012 | Clarke et al. | |
| 8,437,872 | B2 | 5/2013 | Prataiola | |
| 8,763,898 | B2 | 7/2014 | Casto et al. | |
| 8,897,691 | B2 * | 11/2014 | Imazu | B65H 45/12 399/397 |
| 9,061,483 | B2 | 6/2015 | Casto et al. | |
| 9,415,580 | B2 | 8/2016 | Beech et al. | |
| 9,499,131 | B2 | 11/2016 | Obert et al. | |
| 2004/0089706 | A1 | 5/2004 | Hill et al. | |
| 2005/0092440 | A1 | 5/2005 | Lindsay et al. | |
| 2009/0194469 | A1 | 8/2009 | Chastain et al. | |
| 2009/0318253 | A1 | 12/2009 | Swinford et al. | |
| 2011/0147093 | A1 | 6/2011 | Allen et al. | |
| 2011/0160027 | A1 | 6/2011 | Pressman et al. | |
| 2012/0275838 | A1 * | 11/2012 | Imazu | G03G 15/6582 493/454 |
| 2014/0110312 | A1 | 4/2014 | Allen et al. | |
| 2014/0110313 | A1 | 4/2014 | Allen et al. | |
| 2016/0244286 | A1 | 8/2016 | Padros et al. | |
| 2017/0313540 | A1 | 11/2017 | Allen et al. | |

* cited by examiner

SYSTEM AND METHOD FOR FOLDING PAPER CARRIERS WITH ATTACHED CARDS

FIELD

The present disclosure relates generally to a paper folder, and more particularly to a paper folder for folding a paper carrier with a rigid card attached.

BACKGROUND

Direct mail is an important tool for businesses to communicate with customers. Many businesses have a need to distribute cards, such as payment cards, identification cards, or membership cards to individuals by mail. The cards may be personalized or combined with other inserts or mailer components, and the entire package must be addressed to the appropriate recipient, all of which makes the preparation of such mailers very labor-intensive and demanding.

Mail preparation and finishing systems increase efficiency by automating the printing, folding, and insertion processes. However, prior folder systems designed to fold pieces of paper alone are ill-equipped to process paper carriers that have a rigid card attached to them. Those systems have a propensity to dislodge or damage the card, misfold the carrier, or jam the machine.

SUMMARY

The present disclosure addresses those and other problems by providing folder systems and related methods for accurately and efficiently folding a paper carrier that has a card attached. The attached cards are stiffer than the paper substrate and cannot pass through a traditional buckle folder. The disclosed systems allow the stiffer cards to be carried along in the folding process without bending the cards or forcing them around radii that are too small, thereby preventing damage to the cards or causing them to separate from the carrier sheet.

Systems of the invention include a movable fold chute that can be aligned with folding nips in order maintain a generally straight paper path into and out of the fold chute, which prevents the portion of the carrier with the card attached from being bent or stressed, and allows the carrier to be folded around the attached card without disturbing the attached card. While in a first position, the fold chute receives a leading portion of the carrier which contains the card from a feeding nip formed at the interface of two rollers aligned with the fold chute such that the carrier travels along a straight path as it travels from the feeding nip into the fold chute. Once the portion of the carrier with the card attached is inside the fold chute, the carrier contacts a buckle stop or other abutment member that stops the advancement of the leading portion while trailing portion of the carrier is still engaged with and advancing through the feeding nip. The fold chute moves or rotates into a second position, wherein the fold chute is aligned with a folding nip. A buckle forms in the still-advancing trailing portion of the carrier. The buckle grows as the trailing portion advances. The buckled portion of the carrier is ingested into the folding nip that is aligned with the fold chute which has moved into its second position. The folding nip creates a fold in the buckled portion of the carrier, and pulls the leading portion with the card attached through the folding nip along a generally straight paper path from the fold chute through the folding nip. The movement of the fold chute is generally timed with the rotation of the rollers that make up the feeding nip and the folding nip so that the paper carrier advances an appropriate distance to allow the entire card-carrying portion of the paper carrier to enter the fold chute along a generally straight paper path before the fold chute has moved enough to cause the carrier to buckle.

In certain aspects, the invention involves a method for folding a carrier with a card attached. The method begins by providing a carrier having a first portion and a second portion, the first portion comprising a card. A first portion of the carrier is fed into an opening of a fold chute without bending the card. The fold chute is then repositioned to create a buckle in the second portion of the carrier. The buckled second portion of the carrier is then ingested into a folding nip aligned with the repositioned fold chute to create a fold in the second portion.

In embodiments of the method, the step of feeding the first portion of the carrier into the opening of the fold chute is facilitated by rotating a first roller and a second roller to cause advancement of the carrier through a feeding nip formed at an interface between the first roller and the second roller. The method may further include contacting the first portion with a buckle stop associated with the fold chute after the feeding step. Contacting the first portion with the buckle stop may cause advancement of the first portion to stop relative to the second portion. The second portion of the carrier may continue advancement through the feeding nip after the first portion has contacted the buckle stop. The continued advancement through the feeding nip causes the buckle in the second portion to grow. The buckle may then grow towards the folding nip until it is ingested by the folding nip. In certain embodiments, the folding nip is formed at an interface between the second roller and a third roller. The first roller, the second roller, and the third roller may rotate at a constant speed throughout the method.

In embodiments, the feeding of the carrier into the fold chute is performed when the fold chute is aligned with the feeding nip such that the carrier enters the opening of the fold chute at an angle $\theta$, wherein $\theta$ is between 0 degrees and 45 degrees with respect to a carrier path defined by the feeding nip, or more particularly between 0 and 30 degrees, between 0 and 20 degrees, between 0 and 10 degrees, or between 0 and 5 degrees. Repositioning the fold chute may involve rotating the fold chute to align the fold chute with the folding nip such that the carrier the opening of the fold chute is at an angle $\theta_1$, wherein $\theta_1$ is between 0 degrees and 45 degrees with respect to a carrier path defined by the folding nip, or more particularly between 0 and 30 degrees, between 0 and 20 degrees, between 0 and 10 degrees, or between 0 and 5 degrees.

A related aspect of the invention relates to a system for folding a carrier with a card attached. The system includes a feeding nip formed at an interface of a first roller and a second roller, a folding nip formed at an interface of the second roller and a third roller, and a movable fold chute comprising an opening, wherein the movable fold chute is configured to assume a first position with the opening aligned with the feeding nip and a second position with the opening aligned with the folding nip.

In embodiments, the movable fold chute comprises a buckle stop. The movable fold chute may be operably associated with a motor configured to repeatedly reposition the movable fold chute between the first and second positions. The feeding nip and the movable fold chute may define a first carrier path that is substantially straight when the movable fold chute is in the first position, and the movable fold chute and the folding nip may define a second carrier path that is substantially straight when the movable fold chute is in the second position. The first carrier path and the second carrier path may be substantially orthogonal to each other.

BRIEF DESCRIPTION OF THE DRAWINGS

Features and advantages of the claimed subject matter will be apparent from the following detailed description of embodiments consistent therewith, which description should be considered with reference to the accompanying drawings.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

Folder systems of the present disclosure use a movable fold chute to receive a portion of a carrier with a card attached to protect the card from being bent or dislodged while another portion of the carrier is folded. The movement of the fold chute aligns the carrier with different folding nips so that the carrier can enter and exit the fold chute along a generally straight paper path.

The folding systems disclosed herein can be integrated into larger mail processing and inserter systems that can attach cards to a carrier and then insert it into an envelope. Inserter systems are automated or semi-automated machines that prepare paper mailers and may include document production modules, document handling applications, and finishing applications. Some example inserters include the EPIC™ inserting system and the RIVAL™ inserting system, both available from BlueCrest Inc (Danbury, CT).

Figure 1:
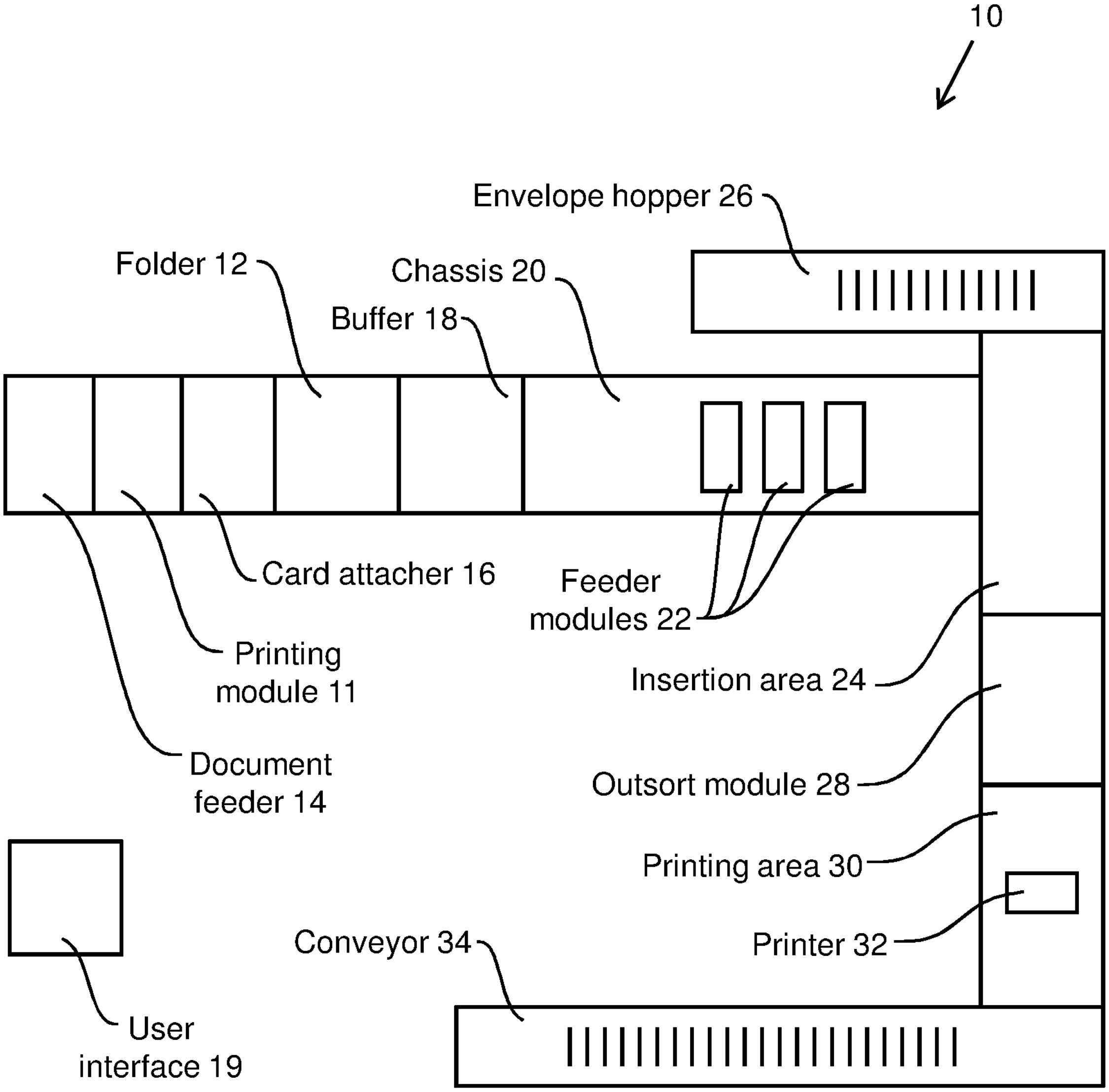
FIG. 1 shows an inserter system.

FIG. 1 shows a schematic view of an inserter system 10 incorporating the folder 12 of invention. The inserter system 10 has several modules for accomplishing different tasks in the mail preparation process. The modules are controlled by a computer and controller (not shown), as will be described in greater detail below. The inserter system 10 as shown in exemplary and other compatible inserters may include different combinations and configurations of the various modules.

Documents are fed into the system 10 by document feeder 14 for processing. In different embodiments, the documents may be pre-printed or blank. Optionally information may be printed on the documents in printing module 11. The documents, which may be bills or financial statements, for example, may be provided by the document feeder 14 as individual cut sheets, or may be cut from a spool using a web cutter (not shown).

The documents next move to a card attacher 16, where cards are attached to the documents, which may be referred to as carriers. The card attachment module 16 may be configured to read information on the carriers and take cards from a stack of pre-embossed cards and attach the cards to the carriers at one or more locations. The carriers then enter the folder 12 where they are folded. The folder 12 folds the carrier with the card attached, as will be described in greater detail below.

The folded carriers next move to a buffer 18, which holds the carriers for sequential processing. The carriers next move to a chassis 20 where inserts from a plurality of feeder modules 22 may be added to the carriers. The carriers next enter an insertion area 24, where the finished carriers are stuffed into envelopes provided by an envelope hopper 26, and the envelopes are sealed. The stuffed, sealed envelopes then enter an outsort module 28, for optionally diverting defective envelopes from the production stream into a reject bin (not shown). Defective envelopes may have carriers that are improperly assembled and/or cards that are detached or damaged and/or may be improperly sealed, for example.

The properly assembled and sealed envelopes next enter a metering and printing area 30, where markings, such as a postage indicia and/or address information, for example, are applied using a printer 32 to form completed mail pieces. Finally, the completed mail pieces are deposited on a conveyor 34.

The system 10 can be monitored and controlled via a user interface 19, which may be physically attached to the system or may be located remotely. The user interface 19 can be a touchscreen or other similar input device. The user interface 19 may display parameters and operating conditions of the various modules and allow a user to control the functioning or one or more modules and switch between jobs as needed. The operation of user interfaces in relation to the system will be described in greater detail below with reference to FIG. 15.

Other systems utilizing more or fewer components and/or different arrangements of components may also be used. It should also be understood that the improvements described in this application can also be used in a stand-alone folder, and there is no need for the folder to be part of a larger document production system. The folder 12 of the present invention may allow a high quality fold to be consistently achieved for carriers having a card attached and having a range of thicknesses without manual adjustment and without degradation of the card, carrier, or the combination thereof.

In direct mailing, it is desirable to prepare a mailer that contains a folded paper carrier with a card attached. Generally to process such a mailer, a paper carrier is prepared which is printed with desired information, and a card is attached. The card is often made of a more rigid material than the paper carrier, such as a thicker paper, cardboard, plastic, metal, or a polymer material. The carrier with the attached card must then be folded, and optionally combined with one or more other inserts or materials, before being inserted into an envelope for mailing. However, traditional buckle stop folding devices cannot accommodate paper carriers that have a rigid card attached.

Figure 2A:
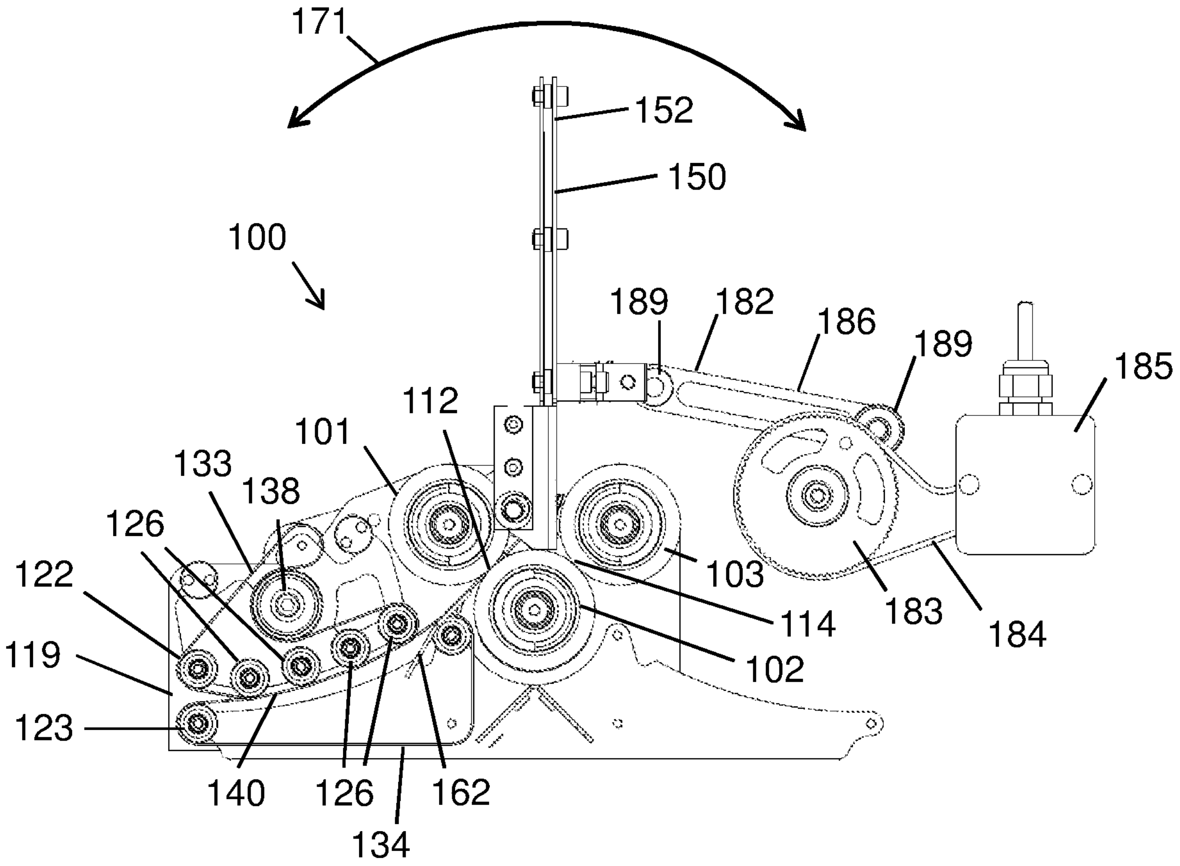
FIG. 2A shows a side view of a folding apparatus.

The folding systems disclosed herein allow carriers with cards attached to be folded by using a unique configuration of rollers and a movable fold chute. An example of a folding apparatus employing a movable fold chute is shown in FIG. 2A. The folding apparatus 100 includes a fold cluster made up of folding rollers 101, 102, and 103. Folding rollers 101 and 102 are aligned to form a feeding nip 112 at an interface therebetween. Folding rollers 102 and 103 are likewise aligned to form a folding nip 114 at an interface therebetween. A paper carrier (not shown) enters the folding apparatus 100 at a paper inlet 119 between drive rollers 122 and 123. Drive rollers 126 along with drive roller 122 are operably connected by a drive belt 133 to guide the paper along the paper path 140. The paper path 140 is defined by the interface of drive belts 133 and 134. Drive belt 133 is driven by drive motor 138 which rotates in a counter-clockwise direction to cause the drive belt 133 to advance. Paper guide 162 is positioned to direct a piece of paper from the paper path 140 defined at the interface of drive belts 133 and 134 up into the feeding nip 112. As will be discussed further below with respect to FIGS. 8-13, the paper guide 162 can direct the paper instead to bypass the feeding nip 112 if the fold cluster is meant to be bypassed. The entire path that the paper travels from paper inlet 119 into feeding nip 112 maintains the paper in a generally straight orientation, meaning that it does not bend around any small radius that would cause an attached card to be dislodged or bent. For example the generally straight orientation may be defined as not bending around a radius that is smaller than, for example, 10 cm, 100 cm, or 1000 cm, or the like.

As explained above, feeding nip 112 is formed between folding rollers 101 and 102. To advance the paper through the feeding nip 112, folding roller 101 rotates in a counter-clockwise direction and folding roller 102 rotates in a clockwise direction. The folding rollers 101 and 102 have a surface that grips the paper therebetween due to friction of the surface and the orientation of the rollers. Folding rollers can be adjustable to provide different levels of grip or to have greater tolerance for papers and carriers of different thicknesses. The folding rollers grip the paper in a manner such that the paper does not slide with respect to the surface of the rollers, but rather is advanced according to the rotation of the rollers. When the paper is between the rollers it is engaged by the rollers to prevent slippage.

As can be seen in FIG. 2A, a piece of paper that travels from the paper path 140 through the feeding nip 112 travels in a direction that is substantially orthogonal to the axis formed between the folding rollers 101 and 102. The feeding nip 112 therefore does not cause a paper carrier traveling therethrough to appreciably bend as it advances through the feeding nip 112.

Fold chute 150 is located downstream of the feeding nip 112. Fold chute 150 is a receptacle with an inner lumen sized and shaped to receive a paper carrier. Fold chute 150 has an opening (not shown) at or near its proximal end, located immediately downstream of the feeding nip 112 through which a paper carrier can enter the inner lumen when it advances out of the feeding nip 112. Fold chute 150 also has a buckle stop (not shown) located within the inner lumen, which is configured to contact a portion of the paper carrier and stop its further advancement into the inner lumen. The buckle stop can simply be the distal end of the inner lumen or it can be one or more bumpers or friction members located within the inner lumen configured to contact a paper carrier. The buckle stop can be adjusted to allow for different sizes of paper or different fold configurations, as will be discussed below with respect to FIGS. 8-13. Fold chute 150 is configured to pivot about a point near its proximal end such that the distal end 152 of the fold chute 150 swings back and forth in an arcuate manner as indicated by arrow 171. The rotation or pivoting of fold chute 150 allows fold chute 150 to assume at least a first position (shown in FIG. 2B) and a second position (shown in FIG. 2D). In operation, the fold chute 150 continuously pivots back and forth to allow the folding of successive carriers with cards attached, as will be described below.

Fold chute 150 is connected to chute arm 182 which is operably associated with chute motor 185. Chute motor 185 drives chute gear 183 with chute belt 184. Chute arm 182 includes a rigid shaft 186 and one or more rotatable or articulable hinges 189. As chute gear 183 rotates, chute arm 182 moves fold chute 150 back and forth. The range of movement of chute arm 182 and fold chute 150 is shown in FIGS. 2B-E. Although fold chute 150 is depicted in FIG. 2A as having a vertical orientation, it is to be understood that fold chute 150 is movable and is therefore operable to assume different positions with respect to the folding rollers, including the first and second positions described above, as well as all positions in between.

Figure 2B:
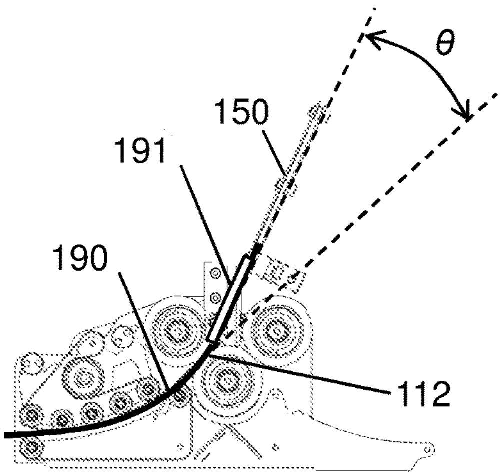
FIGS. 2B-E show the folding apparatus of FIG. 2A in different stages of performing a folding method on a paper carrier with a rigid card attached.
Figure 2C:
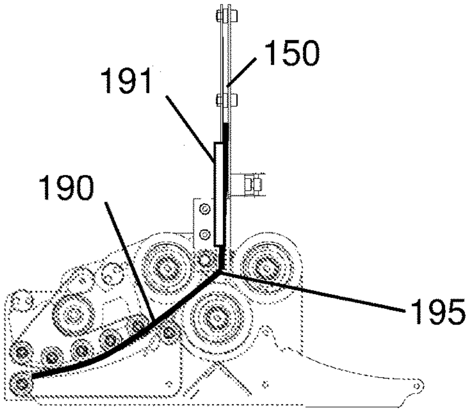
Figure 2D:
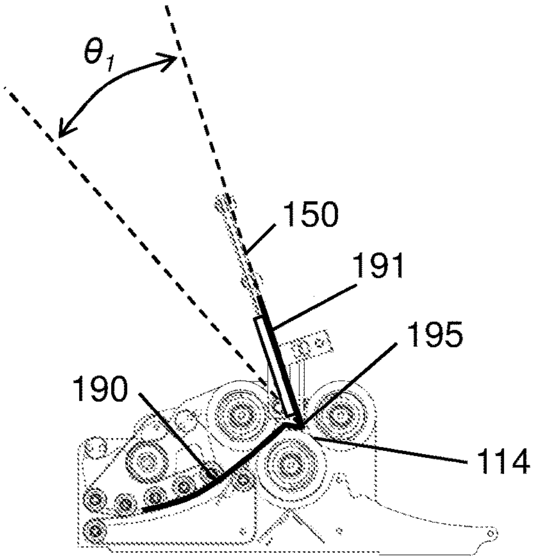
Figure 2E:
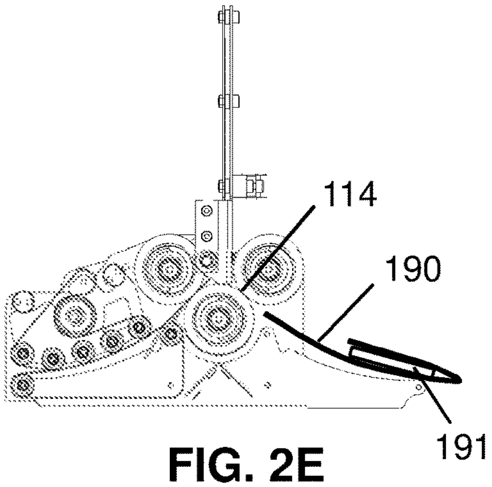

FIGS. 2B-E show a paper carrier 190 with a card 191 attached as they travels through the folding apparatus 100. FIGS. 2B-E are shown in cross-section so that the position of the paper 190 and card 191 within the fold chute 150 are visible. In FIG. 2B, the paper carrier 190 with a card 191 enters folder chute 150. The entrance angle, θ, between the paper path in the feeding nip 112 and the angle of the fold chute 150, and depicted as dotted lines, is small, for example less than about 40 degrees, less than about 35 degrees, less than about 30 degrees, less than about 25 degrees, less than about 20 degrees, less than about 15 degrees, less than about 10 degrees, less than about 5 degrees, or less than about 1 degree, to prevent damage to the card 191 as it enters the fold chute 150. Once the majority of the card portion of the carrier 190 is out of the feeding nip 112, the fold chute 150 moves counter-clockwise, as shown in FIG. 2C. When the lead edge of the carrier 190 reaches the buckle stop (not shown), the fold chute 150 should be in generally vertical orientation, and the document buckle 195 will just begin to form. The card 191 is in the fold chute 150 at this point and protected. As the buckle 195 continues to form, the fold chute 150 travels past center and prepares to align the card for exit through the folding nip 114, as shown in FIG. 2D. Like the entrance angle, θ, the exit angle $\theta_1$, is also low to prevent damage to the card as it exits the fold chute 150. As shown in FIG. 2E, the folder carrier 190 emerges from the folding nip 114 with its first fold complete. The process can be repeated again in another fold cluster to make the final C or Z fold, as will be described in greater detail below.

FIGS. 3-6 show a schematic depiction of the coordinated movement of the fold chute throughout the folding process.

Figure 3:
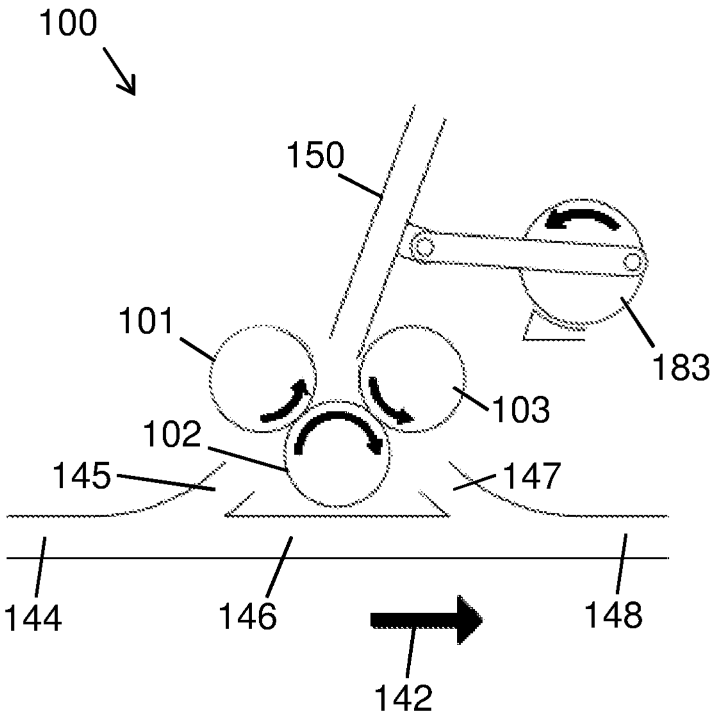
FIG. 3 is a schematic drawing of a folding apparatus.

FIG. 3 shows a schematic drawing of folding apparatus 100 with folding rollers 101-103 and fold chute 150 operably connected to gear 183 driven by a motor (not shown). Paper travels from left to right, as indicated by arrow 142. Paper travels down a first paper path 144 and can be directed by a paper guide (not shown) into either a fold path 145 or a bypass path 146. If the carrier is meant to be folded, the paper guide directs the carrier into the fold path 145, where it is folded in the manner described above and sent through the exit path 147. If the carrier is not meant to be folded, the paper guide directs the carrier into the bypass path. Folded carriers and unfolded carriers travel down path 148 for further downstream processing.

Figure 4:
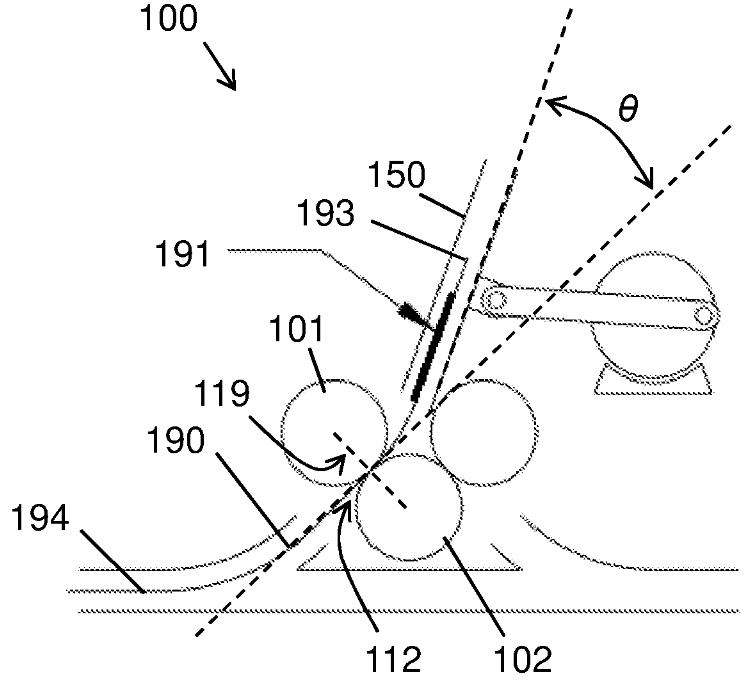
FIGS. 4-6 show the process of folding a paper carrier using a folding apparatus.
Figure 5:
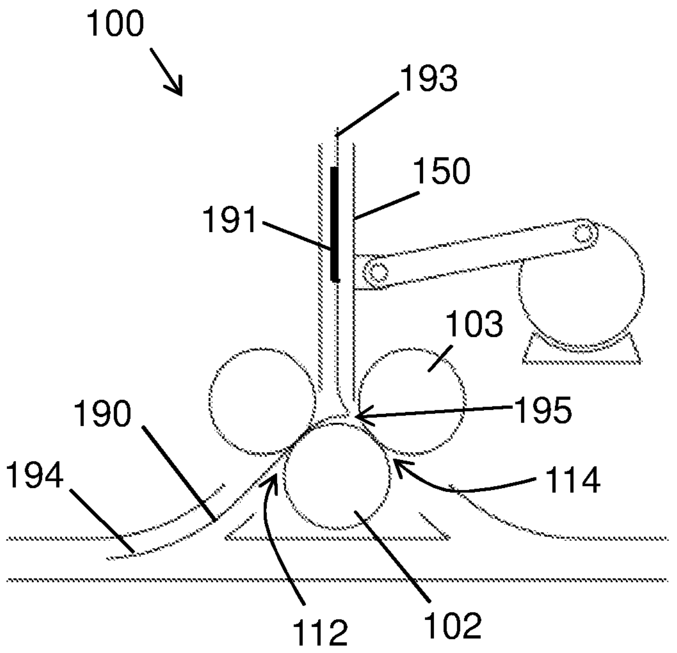

FIG. 4 shows a paper carrier 190 entering the folding apparatus 100. The leading portion 193 of the carrier has a rigid card 191 or other rigid object attached enters the folding apparatus ahead of the trailing portion 194 of the carrier. The fold chute 150 is in a first position wherein it is substantially aligned with the paper path of the paper traveling through feeding nip 112. In this orientation, fold chute 150 is generally orthogonal to the axis represented by dotted line 119 between folding rollers 101 and 102, or is no greater than angle θ from perpendicular with axis 119. In embodiments the angle θ is no more than approximately 40 degrees, 35 degrees, 30 degrees, 25 degrees, 20 degrees, 15 degrees, 10 degrees, 5 degrees, or 1 degree. The timing of the movement of fold chute 150 is configured such that fold chute 150 is in the first position when a paper carrier is emerging from the feeding nip 112.

With the fold chute 150 in the first position, a leading portion 193 of a paper carrier 190 with a card 191 attached is advanced through feeding nip 112 and can enter the inner lumen of the fold chute 150 without bending. With the entire card 191 inside the fold chute 150, the fold chute 150 rotates counter-clockwise, from the position of fold chute 150 shown in FIG. 4 to the vertical position of fold chute 150 shown in FIG. 5. The leading portion 193 of the paper carrier 190 contacts the buckle stop (not shown) while the trailing portion 194 of the paper carrier 190 is still engaged with and advancing through feeding nip 112. Contact with the buckle stop causes the leading portion 193 of the paper carrier 190 to stop, and the continuing advancement of the trailing portion 194 via the feeding nip 112 causes a buckle 195 to form. The contact with the buckle stop occurs in conjunction with the fold chute 150 rotating in a counter-clockwise manner, causing the buckle 195 to form in a downward direction towards folding nip 114. Folding nip 114 is at the interface between folding roller 102 and folding roller 103. Fold chute 150 continues rotating in the counter-clockwise manner and feeding nip 112 continues advancing the trailing portion of the carrier 190 causing the buckle 195 to grow toward folding nip 114. Because the leading portion 193 of the carrier 190 which has the card 191 attached is housed within the fold chute 150 during buckle formation, the card 191 remains flat and undisturbed.

Figure 6:
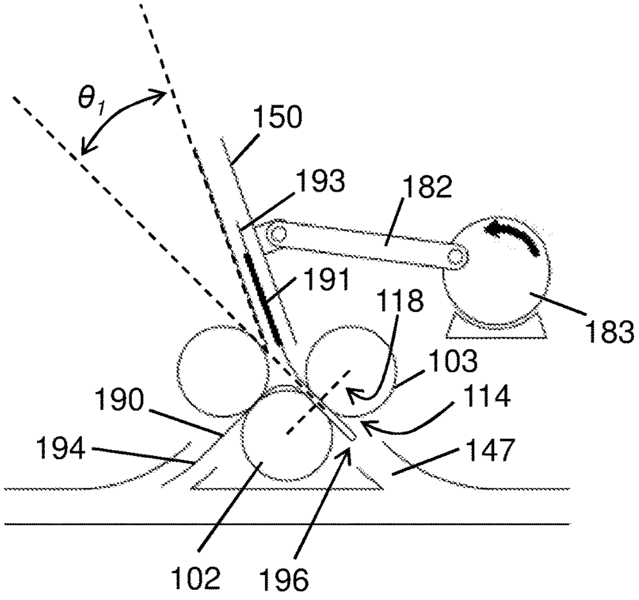

By the time fold chute 150 reaches the second position, as depicted in FIG. 6, the growing buckle 195 has contacted the folding rollers 102 and 103 and is ingested into the folding nip 114 which causes a fold 196 to form in the trailing portion of the carrier 190. As the fold is created, the leading portion 193 of the carrier is withdrawn out of the fold chute 150, which by this time is substantially aligned with the folding nip 114 such that the card and carrier exit the fold chute 150 along a substantially straight path and are advanced through folding nip 114 without the card 191 being bent. The carrier 190 with the card 191 attached exits the fold chute 150 at an angle that is substantially orthogonal to the axis 118 between rollers 102 and 103. Substantially orthogonal includes being at an angle $\theta_1$ from perpendicular with axis 118, wherein the angle $\theta_1$ is less than about 35 degrees, less than about 30 degrees, less than about 25 degrees, less than about 20 degrees, less than about 15 degrees, less than about 10 degrees, less than about 5 degrees, or less than about 1 degree.

The now-folded carrier with the card attached travels down the exit path 147, and the process can be repeated with another carrier. Chute motor (not shown) continues rotating chute gear 183 which causes chute arm 182 to rotate fold chute 150 back in a clockwise direction, causing fold chute 150 to assume the first position once again, where it can receive another carrier from the feeding nip 112. The process repeats itself for additional carriers as needed.

Systems of the present invention encompass various combinations and configurations of folding apparatuses, such that a variety of folds can be made in a carrier with a card attached. Multiple folding apparatuses can be arranged one after another in order to make a series of folds in a carrier. The folding apparatuses are compatible with half folds, C-folds, Z-folds, quarter folds, each of which can be configured with a card placed on different folds of the carrier. Other fold configurations are possible as well, as the person of ordinary skill in the art could envision based on the disclosure herein.

Figure 7:
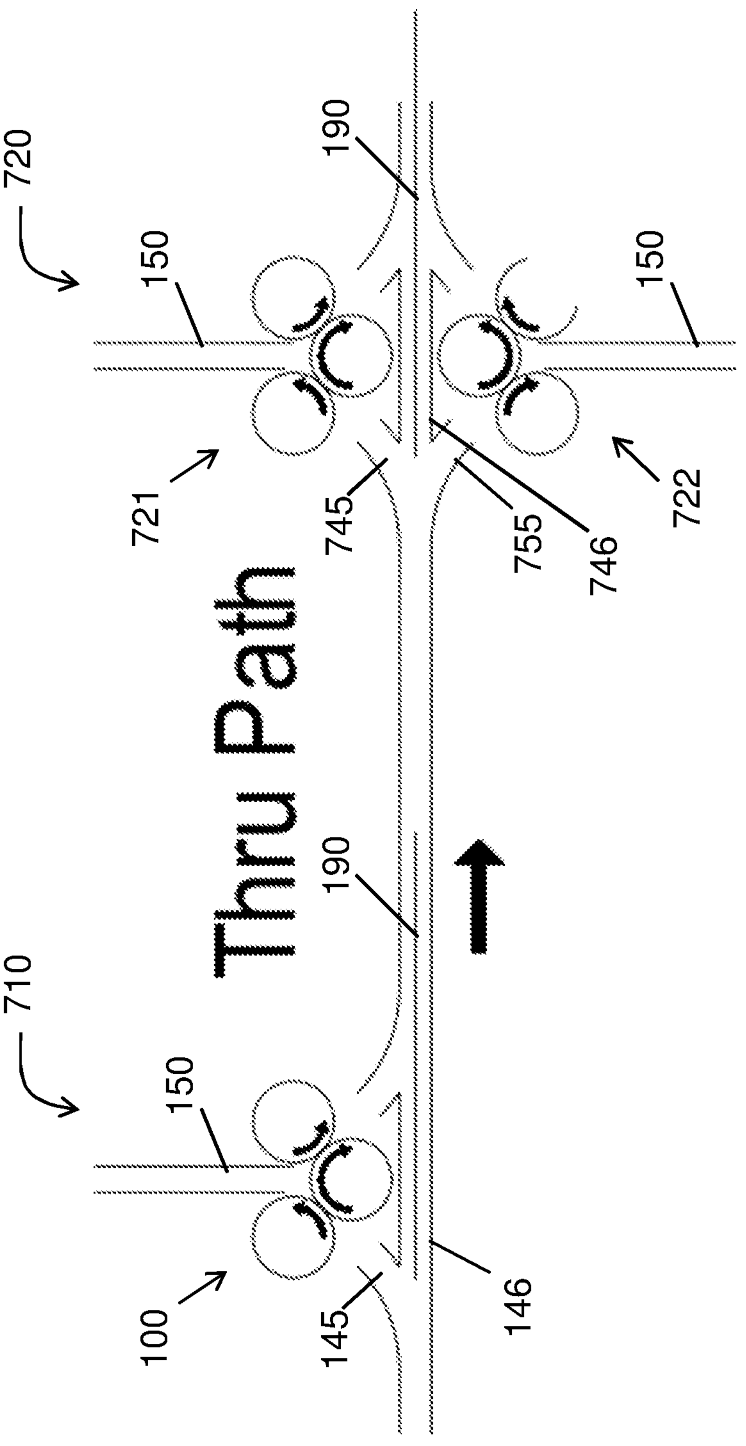
FIG. 7 shows a system incorporating multiple folding apparatuses with different paper paths.

An exemplary arrangement of folding apparatuses in a folding system of the present invention is shown in FIG. 7. The paper path includes a first fold station 710 and a second fold station 720 downstream of the first fold station 710. The first fold station 710 includes one folding apparatus 100 as has been described above. The second fold station 720 includes an upper folding apparatus 721 and a lower folding apparatus 722, each of which is substantially similar to the folding apparatus 100 described above. Paper guides (not shown) direct a piece of paper traveling from left to right into the various fold paths and bypass paths. A first paper guide associated with the first fold station 710 directs paper either into fold path 145 to create a fold or into a bypass path 146 to avoid creating a fold. At the second fold station, a paper guide can direct the paper either into the upper fold apparatus 721 via fold path 745 or into the lower fold apparatus 722 via fold path 755, depending on the type of fold desired, or alternatively the paper guide can guide the paper into bypass path 746 to avoid creating a fold at the second fold station 720. As shown in FIG. 7, paper carriers 190 are bypassing both fold stations via the bypass paths 146 and 746. This represents the “thru path” wherein no folds are created.

Some non-limiting examples of fold configurations that can be formed with the disclosed system are shown in FIGS. 8-13. As will be explained with respect to particular fold paths described below, the buckle stop in the fold chute 150 associated with each respective folding apparatus can be adjusted—and the timing of the fold chute movement and roller speed can likewise be adjusted—to control the precise location of the fold in the paper. For example, a fold cluster can create a fold in the middle of the paper to create two equal halves, or the fold cluster can create a fold at a one-third or one-quarter location on the paper.

Figure 8:
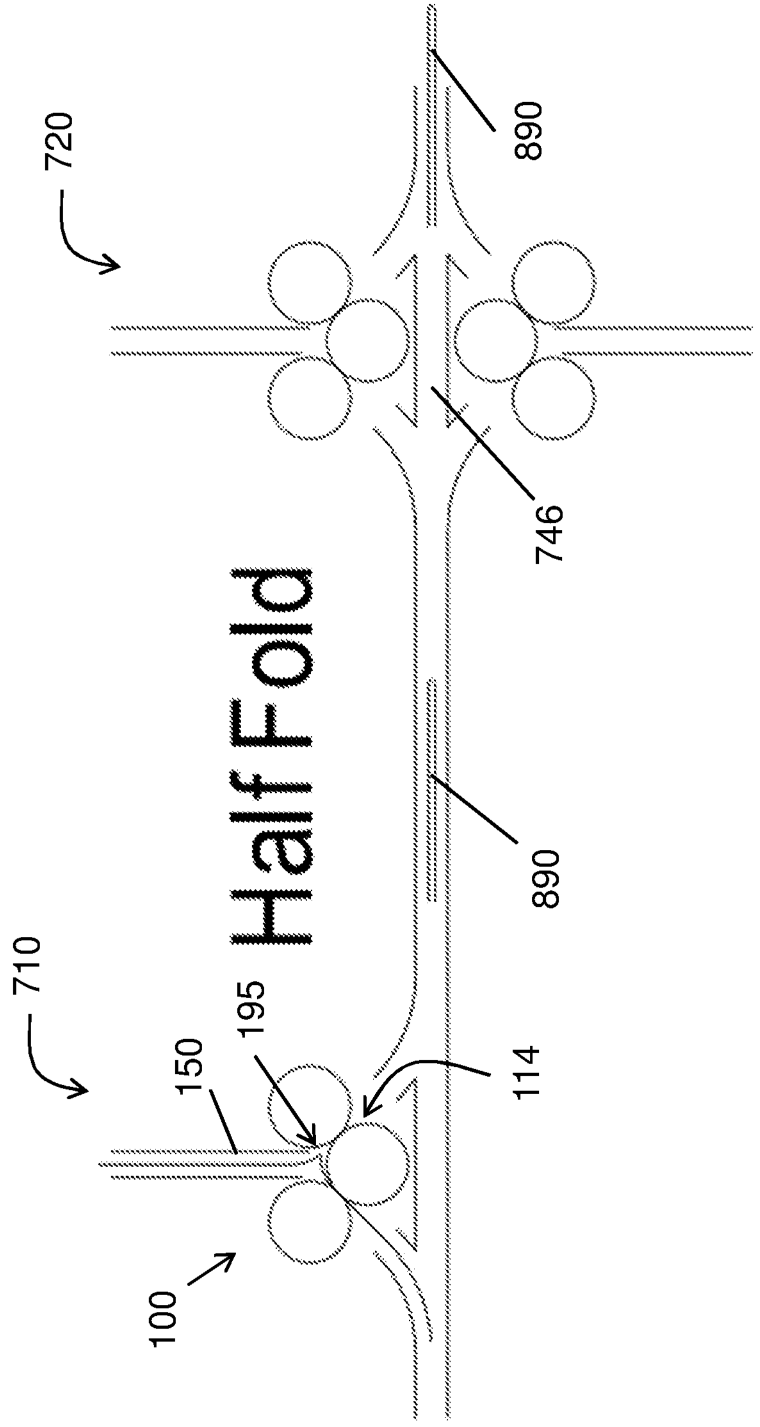
FIG. 8 shows a process for creating a half fold in a paper carrier using a system with multiple folding apparatuses.

FIG. 8 shows a process for creating a half-fold using the disclosed folding apparatuses. For simplicity, paper carriers 190 are shown without a card attached, but it should be understood that a card would generally be attached to the carrier as described above. The paper carrier 190 is directed into the folding apparatus 100 of the first fold station 710 by a paper guide (not shown). The fold chute 150 and buckle stop (not shown) are configured to allow a predetermined length of the paper carrier 190 to enter the fold chute 150 such that the buckle 195 forms at the midpoint of the length of the paper carrier 190, thereby creating a half-folded carrier when the buckled portion is ingested by the folding nip 114. A completed half-folded carrier 890 is shown traveling between the first fold station 710 and the second fold station 720. Since no further fold is desired, a second paper guide (not shown) directs the half-folded carriers 890 to bypass the second fold station 720 via bypass path 746. In the embodiment shown in FIG. 8, the half-fold is created such that the bottom surface of the paper carrier becomes the outside of the folded carrier. In another configuration, a half-fold could be created with the top surface of the paper carrier becoming the outside of the folded carrier. This could be done by bypassing the first fold station 710 and directing the carrier to the lower fold apparatus 722 to create a half fold.

Figure 9:
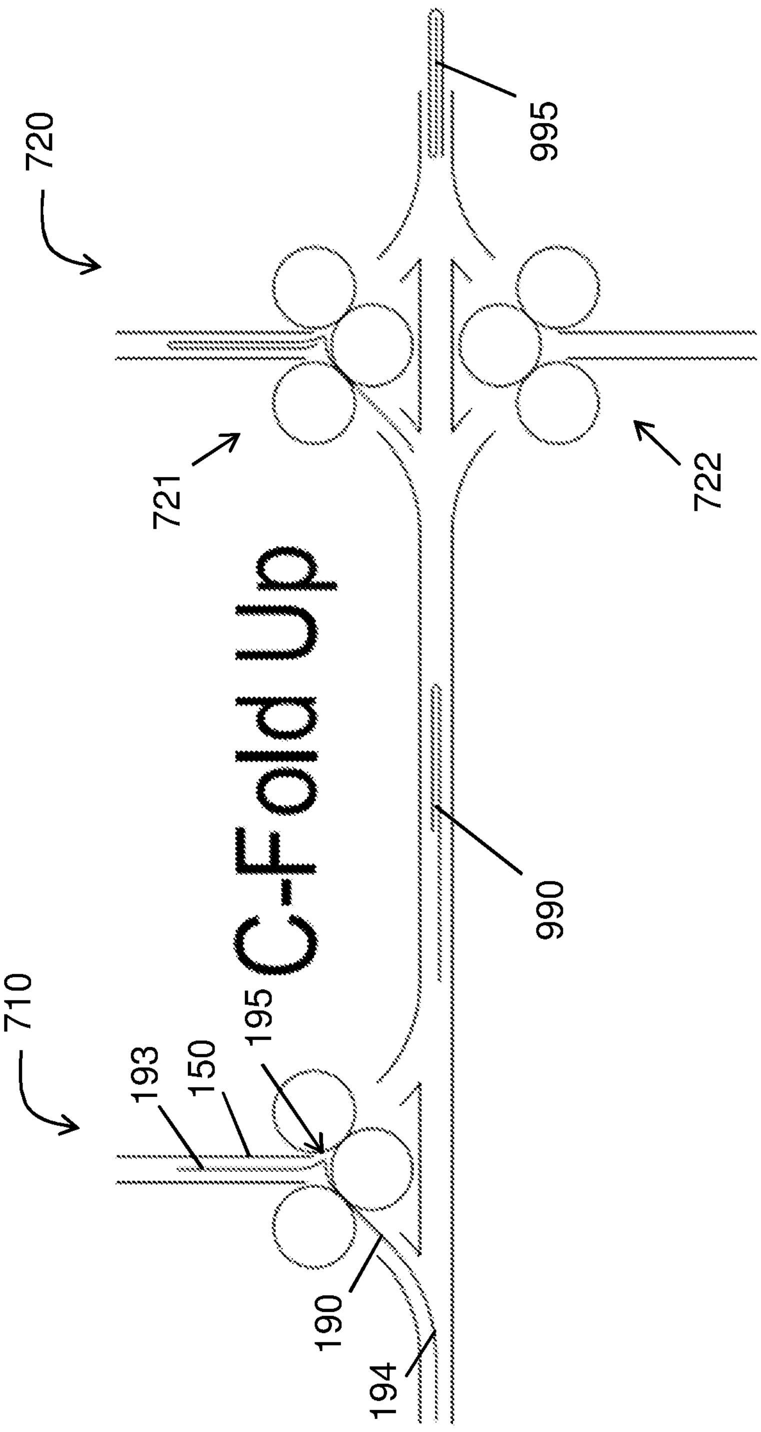
FIG. 9 shows a process for creating a C-fold in a paper carrier using a system with multiple folding apparatuses.
Figure 10:
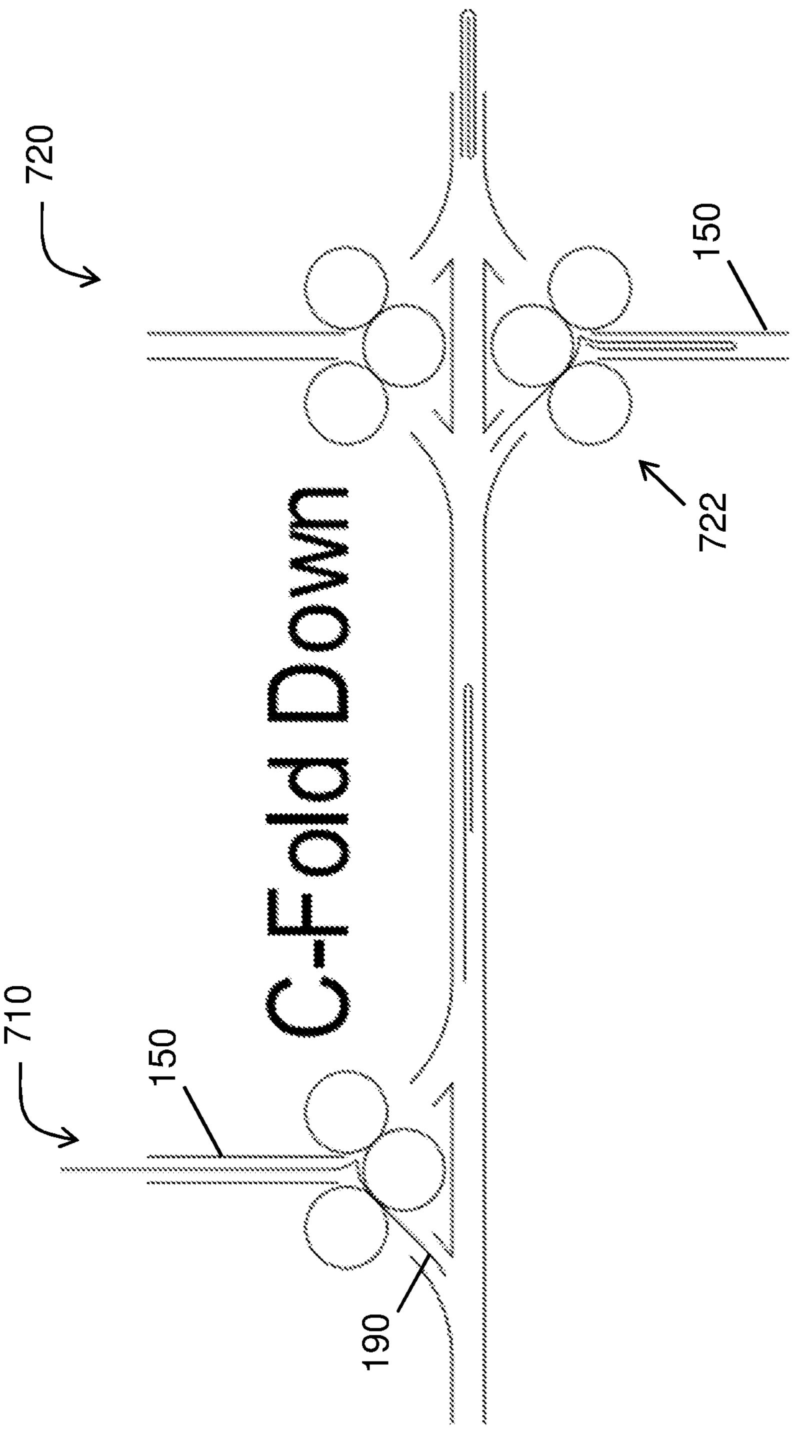
FIG. 10 shows a process for creating another configuration of a C-fold in a paper carrier using a system with multiple folding apparatuses.
Figure 11:
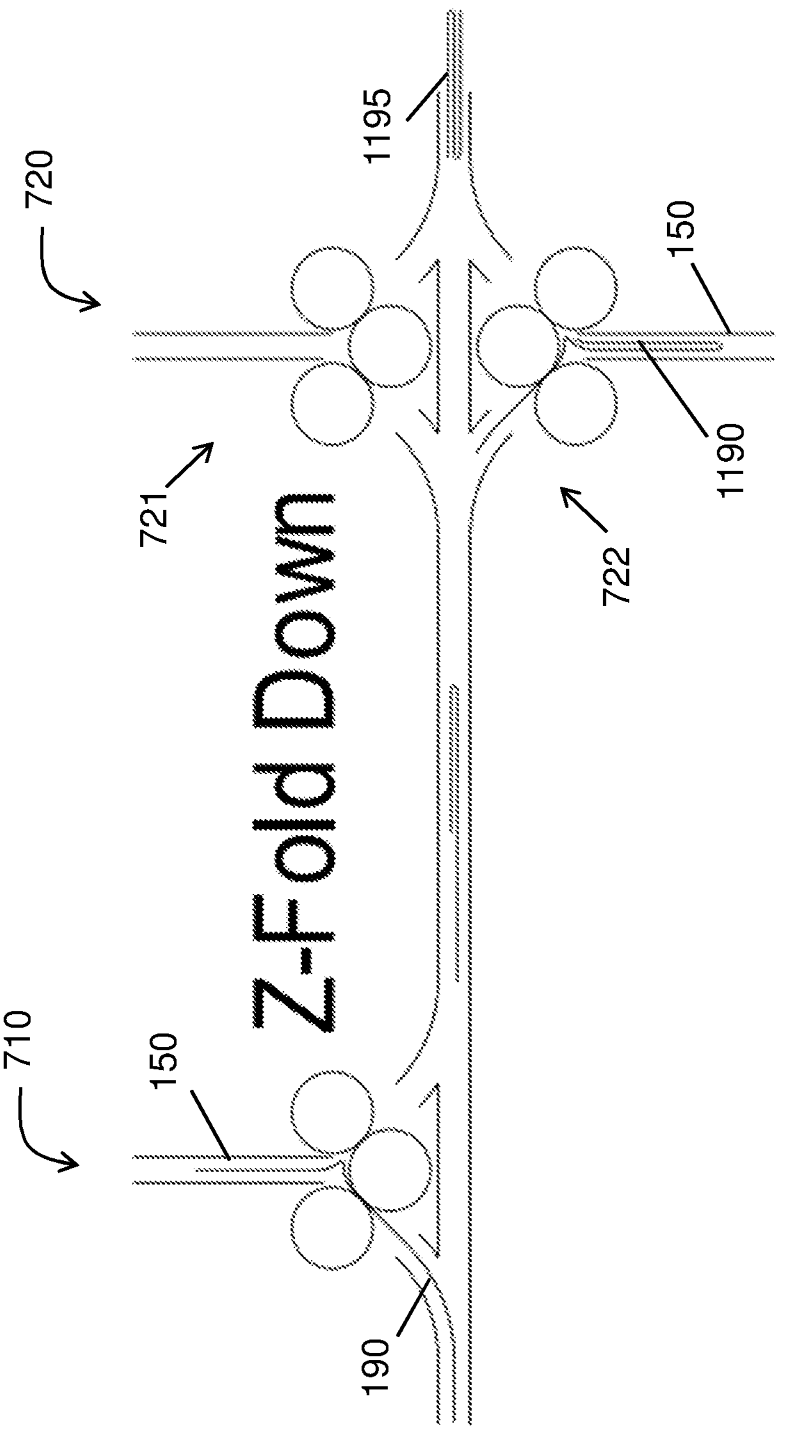
FIG. 11 shows a process for creating a Z-fold in a paper carrier using a system with multiple folding apparatuses.

FIGS. 9-11 show various trifold configurations. Two folds are required in order to fold a paper into thirds. A first fold can be formed about a third of the way down the length of a piece of paper, and a second fold can be formed at about two-thirds. Trifolds include C-folds, wherein both folds are made in the same direction, and Z-folds, wherein the two folds are made in opposing directions.

FIG. 9 shows a process for creating a C-fold using the disclosed folding system. The paper carrier 190 is directed into the first fold cluster where a fold is made by methods described herein at approximately one-third the length of the carrier. The folded carrier 990 is then directed into one of the folding apparatuses 721 or 722 of the second fold station 720 to create a second fold, completing the C-fold configuration. A first configuration of C-fold ("C-fold up") can be made by the process shown in FIG. 9. The carrier is fed into the fold chute 150 until approximately one-third of the carrier is in the fold chute, to create a buckle 195 in the carrier. The leading portion 193 of the carrier 190 constitutes about one-third of the carrier, and the trailing portion 194 of the carrier constitutes about two-thirds of the carrier. The partially folded carrier 990 is then directed into the upper folding apparatus 721 of the second fold station 720 which creates the second fold, completing the C-fold. A completed C-folded carrier 995 is shown downstream of the second fold station 720.

A different configuration of C-fold ("C-fold down") can be made by the process shown in FIG. 10. In this configuration, two-thirds of the carrier enters the fold chute 150 and the first fold is thus created further down the length of the carrier 190. The second fold is then created by directing the carrier into the lower folding apparatus 722 of the second fold station 720. This leads to a different orientation of C-fold than is created in FIG. 9. Such different configurations may be desired based on where on the carrier the card is attached.

When the card is attached to the middle section of a trifold carrier, the "C-fold down" configuration should be used, so that the middle section is inside the respective fold chute 150 during each fold. If the card is attached to the leading section, the "C-fold up" configuration should be used.

FIG. 11 shows a process for creating a Z-fold. The "Z-fold down" process begins the same as the "C-fold up" process described above, except instead of being directed into the upper folding apparatus 721 for the second fold, the carrier is directed into the lower folding apparatus 722. Carrier 1190 is shown being folded in folding apparatus 722. The completed Z-folded carrier 1195 is shown downstream of the second fold station 720. A differently configured Z-fold can be created using the first step of the "C-fold down" process described above, and directing the carrier into the upper folding apparatus 721 to complete the second fold.

Figure 12:
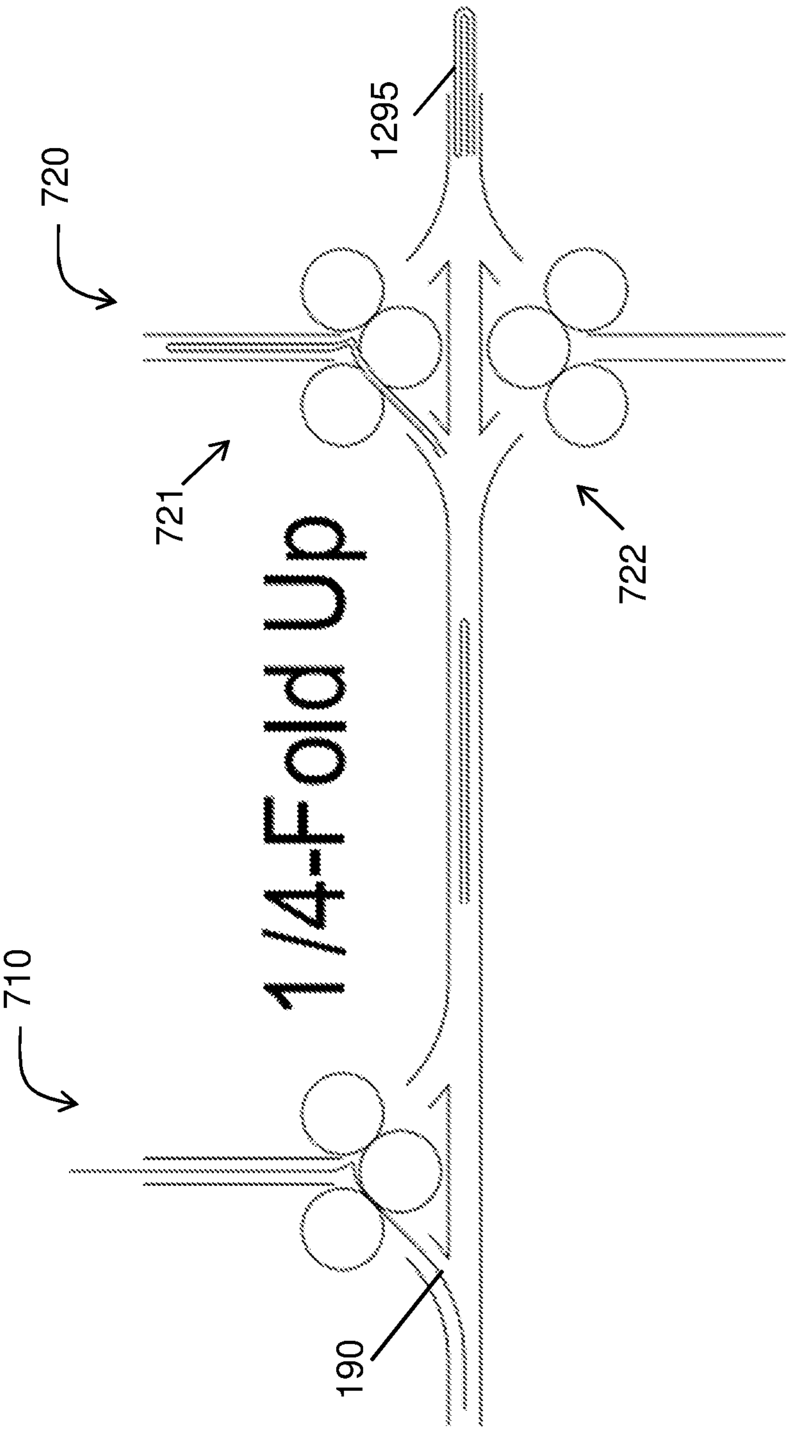
FIG. 12 shows a process for creating a quarter fold in a paper carrier using a system with multiple folding apparatuses.
Figure 13:
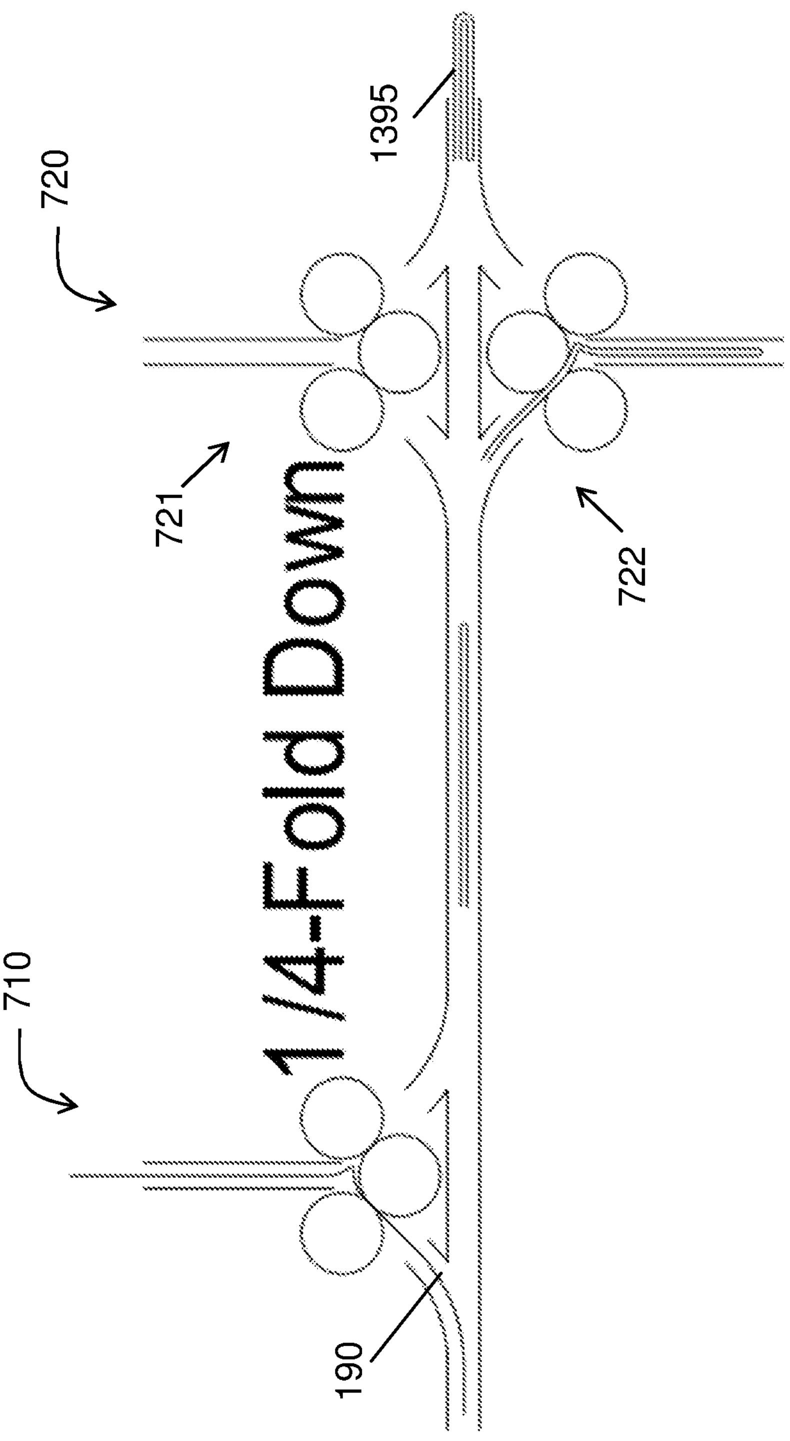
FIG. 13 shows a process for creating another configuration of a quarter fold in a paper carrier using a system with multiple folding apparatuses.

FIGS. 12 and 13 show processes for creating quarter folds. The carrier 190 enters the first fold station 710 and is folded in half, using the same process as shown in FIG. 8 to create a half fold. However, instead of bypassing the second fold station 720, the half-folded carriers are then directed either to the upper folding apparatus 721 as in FIG. 12 or the lower folding apparatus 722 as in FIG. 13. In both FIGS. 12 and 13, the half-folded carriers are folded in half once again by the second fold station to create quarter-folded carriers 1295 and 1395.

The person of skill in the art will understand the various configurations for creating C-folds and Z-folds, as well as half folds and quarter folds, and would be able to design an appropriate fold scheme using the systems disclosed herein, depending on the intended location of the attached card and the orientation of printing on the top and bottom surface of the carrier. Different fold schemes, as described with respect to the fold schemes shown in FIGS. 8-13, are dependent on the location of the buckle stop, the speed of the rollers and fold chutes, and the orientation of the paper guides to direct the carrier into the folding apparatuses or bypass paths.

Figure 14A:
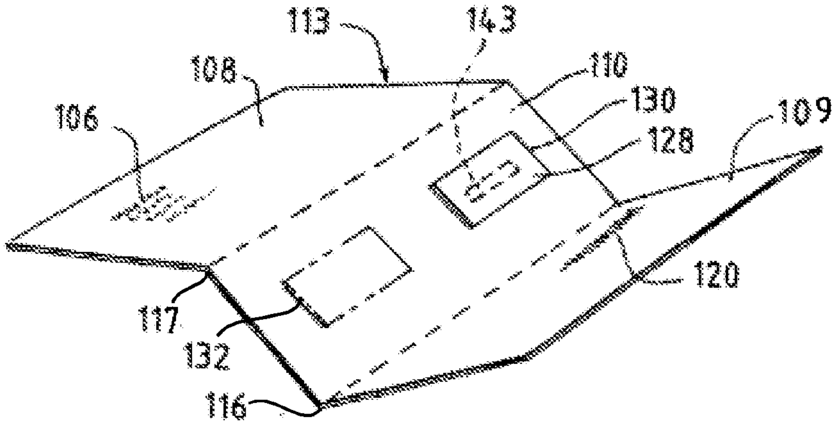
FIG. 14A is a perspective view of a folded carrier with a card attached, of the type produced by the folding systems disclosed herein.
Figure 14B:
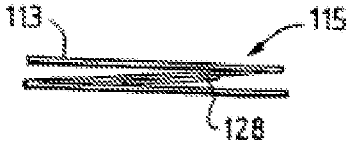
FIG. 14B is an end view of the carrier in a folded state with the card attached ready for insertion into an envelope.

FIG. 14A shows a perspective view of a sample completed carrier package 115, formed by the folded carrier 113 with a card 128 attached at location 130. FIG. 14B shows an end view of the folded carrier package 115. The folded carrier 113 is folded in a Z-fold. A cardholder name and address and/or other account information 106 can be printed on one of three panels 108, 109, and 110 of the carrier 113. The three panels are defined by two fold-lines 116 and 117, which were created by a folding apparatus as described above. The information 106 can be printed, for example, by the printing module 11 shown in FIG. 1. The printer module may also print a bar code 120 representative of information concerning the account on another of the panels, such as the end panel 109, such as the account number and the number of cards that are to be attached to the carrier 113. In other configurations of folded carriers it may be desirable to print the information 106 or the bar code information 120 at other selected locations on the carrier 113.

The cards 128 generally have an account number and an account holder's name embossed on the card and the same information encoded on a magnetic stripe on the back of the card 128. Additional information, such as the number of cards to be attached to the carrier may also be contained in the bar code. In addition, the back of the card has the account number and account name encoded in bar code printed on the back of the card. This information is checked for proper encoding and if the coding is not correct or if the coding does not match the encoded information of a carrier to which it is to be attached, the card 128 is passed to a card reject bin.

Cards may be attached to the carrier 113, for example at location 130 or location 132 or elsewhere, by means of an adhesive label 143. One side of the adhesive label 143 is attached to the card by a heat activated adhesive, such as a releasable adhesive. The other side of the label is attached to the carrier by means of a permanent adhesive.

As described above, and as will be apparent to the person of ordinary skill in the art, the roller speed, fold chute motor speed, and orientation of paper guides combine to determine the particular fold configuration of a paper carrier traveling through the folding systems disclosed herein. The operation and function of the various moving parts are driven by motors and controlled by one or more computer processors operable to execute instructions. The various parameters can be controlled and monitored from a display device as described below.

Aspects of the present disclosure described herein, such as the speed and control of rollers, fold chutes, and paper guides, as described above, and the monitoring and controlling of various parameters, can be performed using any type of computing device, such as a computer or programmable logic controller (PLC), that includes a processor, e.g., a central processing unit, or any combination of computing devices where each device performs at least part of the process or method. In some embodiments, systems and methods described herein may be performed with a handheld device, e.g., a smart tablet, a smart phone, or a specialty device produced for the system.

The user interface 19 as shown in FIG. 1 is operably associated with a processor that is configured to control the operation of the mail insertion system including the folding apparatus. The user interface may employ software, hardware, firmware, hardwiring, or combinations of any of these. Features implementing functions can also be physically located at various positions, including being distributed such that portions of functions are implemented at different physical locations (e.g., folding apparatus or inserter apparatus in one room and host workstation in another, or in separate buildings, for example, with wireless or wired connections).

Processors suitable for the execution of computer program include, by way of example, both general and special purpose microprocessors, and any one or more processor of any kind of digital computer. Generally, a processor will receive instructions and data from a read-only memory or a random access memory or both. Elements of computer are a processor for executing instructions and one or more memory devices for storing instructions and data. Generally, a computer will also include, or be operatively coupled to receive data from or transfer data to, or both, one or more non-transitory mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, solid state drive (SSD), and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the systems described herein can be implemented on a computer having an I/O device, e.g., a CRT, LCD, LED, or projection device for displaying information to the user and an input or output device such as a keyboard and a pointing device, (e.g., a mouse or a trackball), by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected through network by any form or medium of digital data communication, e.g., a communication network. Examples of communication networks include cell network (e.g., 3G or 4G), a local area network (LAN), and a wide area network (WAN), e.g., the Internet.

The subject matter described herein can be implemented as one or more computer program products, such as one or more computer programs tangibly embodied in an information carrier (e.g., in a non-transitory computer-readable medium) for execution by, or to control the operation of, data processing apparatus (e.g., a programmable processor, a computer, or multiple computers). A computer program (also known as a program, software, software application, app, macro, or code) can be written in any form of programming language, including compiled or interpreted languages (e.g., C, C++, Perl), and it can be deployed in any form, including as a stand-alone program or as a module, component, subroutine, or other unit suitable for use in a computing environment. Systems and methods of the invention can include instructions written in any suitable programming language known in the art, including, without limitation, C, C++, Perl, Java, ActiveX, HTML5, Visual Basic, or JavaScript.

A computer program does not necessarily correspond to a file. A program can be stored in a file or a portion of file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

A file can be a digital file, for example, stored on a hard drive, SSD, CD, or other tangible, non-transitory medium. A file can be sent from one device to another over a network (e.g., as packets being sent from a server to a client, for example, through a Network Interface Card, modem, wireless card, or similar).

Writing a file according to embodiments of the invention involves transforming a tangible, non-transitory, computer-readable medium, for example, by adding, removing, or rearranging particles (e.g., with a net charge or dipole moment into patterns of magnetization by read/write heads), the patterns then representing new collocations of information about objective physical phenomena desired by, and useful to, the user. In some embodiments, writing involves a physical transformation of material in tangible, non-transitory computer readable media (e.g., with certain optical properties so that optical read/write devices can then read the new and useful collocation of information, e.g., burning a CD-ROM). In some embodiments, writing a file includes transforming a physical flash memory apparatus such as NAND flash memory device and storing information by transforming physical elements in an array of memory cells made from floating-gate transistors. Methods of writing a file are well-known in the art and, for example, can be invoked manually or automatically by a program or by a save command from software or a write command from a programming language.

Suitable computing devices typically include mass memory, at least one graphical user interface, at least one display device, and typically include communication between devices. The mass memory illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks (DVD) or other optical storage, magnetic cassettes, magnetic tape, magnetic disk storage or other magnetic storage devices, Radiofrequency Identification tags or chips, or any other medium which can be used to store the desired information and which can be accessed by a computing device.

As one skilled in the art would recognize as necessary or best-suited for performance of the methods of the invention, a computer system or machines employed in embodiments of the invention may include one or more processors (e.g., a central processing unit (CPU) a graphics processing unit (GPU) or both), a main memory and a static memory, which communicate with each other via a bus.

Figure 15:
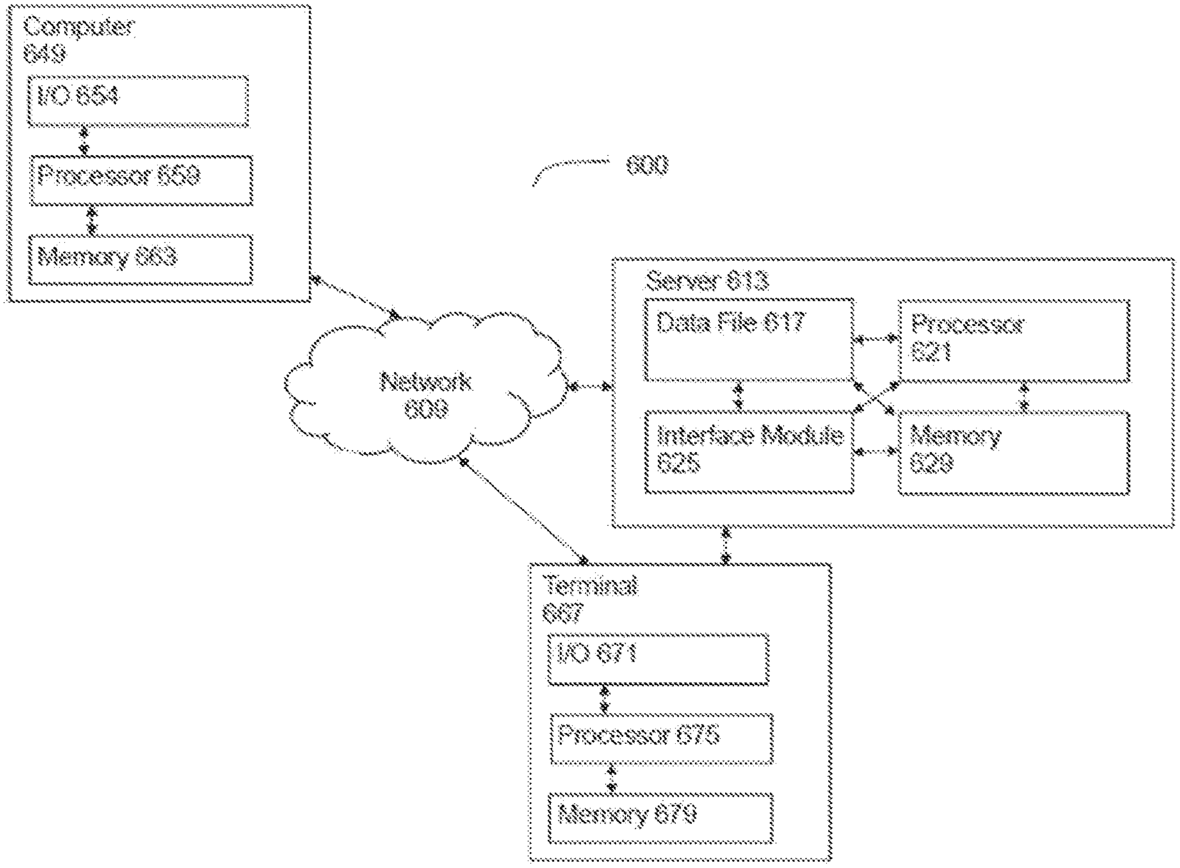
FIG. 15 shows a system architecture for use with the invention.

In an example embodiment shown in FIG. 15, system 600 can include a computer 649 (e.g., laptop, desktop, or tablet). The computer 649 may be configured to communicate across a network 609. Computer 649 includes one or more processor 659 and memory 663 as well as an input/output mechanism 654. Where methods of the invention employ a client/server architecture, operations of methods of the invention may be performed using server 613, which includes one or more of processor 621 and memory 629, capable of obtaining data, instructions, etc., or providing results via interface module 625 or providing results as a file 617. Server 613 may be engaged over network 609 through computer 649 or terminal 667, or server 613 may be directly connected to terminal 667, including one or more processor 675 and memory 679, as well as input/output mechanism 671.

System 600 or machines according to example embodiments of the invention may further include, for any of I/O 649, 637, or 671 a video display unit (e.g., a liquid crystal display (LCD) or a cathode ray tube (CRT)). Computer systems or machines according to some embodiments can also include an alphanumeric input device (e.g., a keyboard), a cursor control device (e.g., a mouse), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem.

Memory 663, 679, or 629 according to example embodiments of the invention can include a machine-readable medium on which is stored one or more sets of instructions (e.g., software) embodying any one or more of the methodologies or functions described herein. The software may also reside, completely or at least partially, within the main memory and/or within the processor during execution thereof by the computer system, the main memory and the processor also constituting machine-readable media. The software may further be transmitted or received over a network via the network interface device.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method for folding a carrier with a card attached, the method comprising:

providing a carrier having a first portion and a second portion, the first portion comprising a card;

feeding the first portion of the carrier into a fold chute without bending the card;

repositioning the fold chute to create a buckle in the second portion of the carrier; and ingesting the buckled second portion of the carrier into a folding nip aligned with the repositioned fold chute to create a fold in the second portion.

2. The method of claim 1, wherein the feeding step is facilitated by rotating a first roller and a second roller to cause advancement of the carrier through a feeding nip formed at an interface between the first roller and the second roller.

3. The method of claim 2, further comprising causing advancement of the first portion of the carrier to stop relative to the second portion of the carrier after the feeding step, wherein the second portion of the carrier continues advancement through the feeding nip after advancement of the first portion has stopped.

4. The method of claim 3, wherein the continued advancement through the feeding nip causes the buckle in the second portion to grow.

5. The method of claim 4, wherein the buckle grows towards the folding nip until it is ingested by the folding nip.

6. The method of claim 2, wherein the folding nip is formed at an interface between the second roller and a third roller.

7. The method of claim 6, wherein the first roller, the second roller, and the third roller rotate at a constant speed throughout the method.

8. The method of claim 2, wherein during the feeding step the fold chute is aligned with the feeding nip such that the carrier enters the opening of the fold chute at an angle θ, wherein θ is between 0 degrees and 45 degrees with respect to a carrier path defined by the feeding nip.

9. The method of claim 8, wherein repositioning comprises rotating the fold chute to align the fold chute with the folding nip such that the carrier the opening of the fold chute is at an angle θ, wherein θ is between 0 degrees and 45 degrees with respect to a carrier path defined by the folding nip.

* * * * *